UNITED STATES PATENT OFFICE.

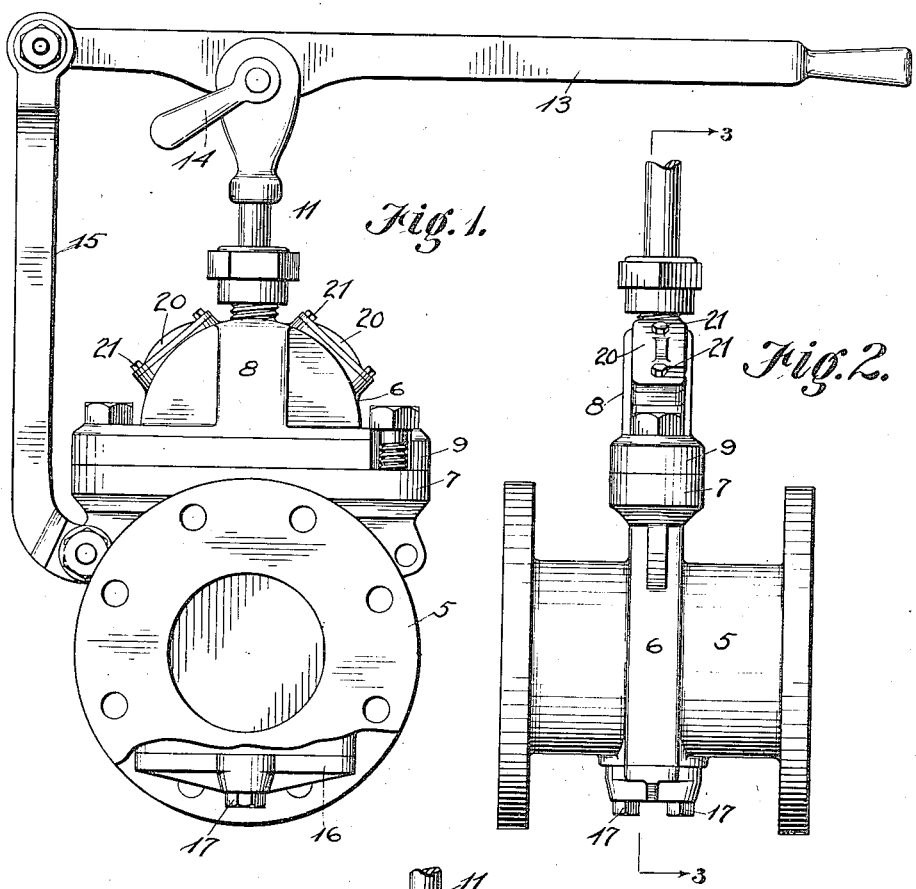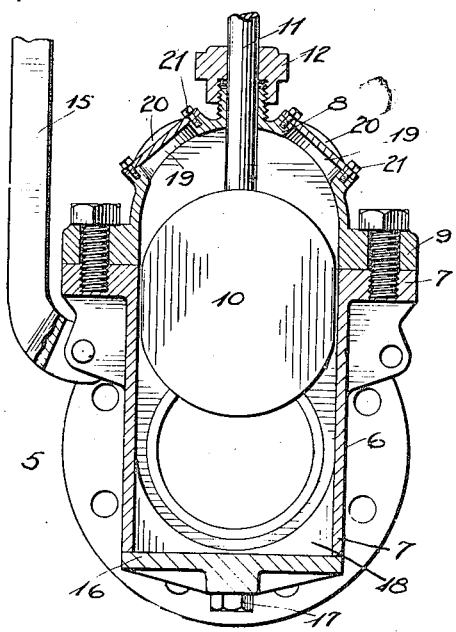

RALPH J. RILEY, OF LIVERMORE FALLS, MAINE.

GATE-VALVE.

1,168,332.    Specification of Letters Patent.    Patented Jan. 18, 1916.

Application filed September 2, 1914. Serial No. 859,799.

*To all whom it may concern:*

Be it known that I, RALPH J. RILEY, a citizen of the United States, and a resident of Livermore Falls, in the county of Androscoggin and State of Maine, have invented a new and Improved Gate-Valve, of which the following is a full, clear, and exact description.

The invention relates to gate valves of low pressure, mainly used for controlling the flow of semi-fluid substances or diluted paste materials such as paper pulp, or any other similar substances.

The object of the invention is to provide a simple, inexpensive and strong gate valve which can be easily and quickly cleaned so as to facilitate the closing or complete opening of the valve no matter in what position the gate or the valve may be.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a face elevation of my gate valve one flange portion of which is partly broken to show the bottom structure; Fig. 2 is a side elevation; and Fig. 3 is a section on line 3—3, Fig. 2.

Referring to the drawings, 5 represents the main section of the gate valve, in which the gate receiving part 6 has its rectangular bore for the gate open at the ends. The part 6 of the main section is provided with a lateral flange or collar 7 forming a seat for a bonnet 8, which is also provided with a flange 9 whereby said bonnet can be bolted to the main section as shown. The gate 10 mounted within the part 6 of the main section has its rod 11 projecting through the bonnet, whereat a packing joint 12 is formed. The projecting end of the rod engages a lever 13 to which the same may be clamped by means of a nut 14. The lever 13 is pivoted to a standard 15 which is secured pivotally to the main section 5. The lower end of the part 6 of the main section 5 is sealed by a plug 16 connected to the part 6 by bolts 17. The part of the plug 16 engaged within the main section 5 has its end arcuated to conform to the edge curvature of the gate 10, for which the said end forms a stop preventing an excessive downward movement of said gate by means of the lever 13. The excessive upward movement of the gate 10 is limited by the bonnet 8.

The bonnet 8 is provided with openings 19 in the wall facing the edge of the gate. The said openings 19 are provided on the opposite sides of the gate rod 11 for the reason that there is little space between the side walls of the bonnet and the rod 11, and no tool can pass therebetween. The openings 19 permit a perfect cleaning or extraction of the material that works its way about the gate into the bonnet and thus prevents the movement of the gate 10 partially or completely. The bonnet 8 has exteriorly raised portions about the openings 19 forming a seat engaged by a cover 20 secured thereto by means of screws 21 on which the cover is mounted to swing, as best seen in Fig. 2.

The advantage of providing the openings 19 in the bonnet is that it permits of cleaning the space above the gate 10 at any position of said gate; thus, it is not necessary to restore the gate to the closed position to clean the same as is customary with the sliding gate valve in which the bonnet is made to turn on the gate rod. It will be seen that when the bonnet is turned on the gate rod at right angles to the plane of the gate it is easy to clean the bore forming the guide for the gate, but it is still a hard proposition to clean the hollow of the bonnet from the material accumulated therein, due to the fact that the opening of the hollow faces the body of the main section.

The plug 16 in the bottom of the main section permits a complete closing of the gate valve when an obstruction lodges in the path of the gate, as by releasing the bolt 17 and moving the gate 10 downward the obstruction will be forced out with the plug, when the plug can be restored to its original position.

From the foregoing description, taken in connection with the accompanying drawings, the advantage of the construction and operation of the device shown will be readily understood by those skilled in the art to which the invention pertains; and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. In a sliding gate valve for pulpy material, a bonnet for the gate and adapted to accumulate pulpy material above the gate, said bonnet having openings opposite the edge of the gate for cleaning the bonnet from the pulpy material and swinging covers therefor normally closing said openings.

2. In a sliding gate valve for pulpy material, a main section having a gate passage open at the ends, a gate in said passage, a bonnet covering one end of the gate passage and adapted to accumulate pulpy material, a removable plug sealing the other end of the gate passage whereby the passage may be cleaned from pulpy material, and means for sliding the gate in the passage, said bonnet having openings in the upper part thereof whereby the gate passage in the bonnet may be cleaned from pulpy material, and covers for said openings.

3. In a sliding gate valve, a main section having a gate passage open at the ends, a gate in the passage, a bonnet over one of the open ends of the gate passage, a removable plug sealing the other end of the gate, said plug forming a stop for the gate in closed position, means for sliding the gate in the passage, said bonnet having openings in the upper part thereof opposite the edge of the gate for cleaning the passage, and swinging covers for said openings normally closing the same.

4. In a sliding gate valve for pulpy material, a main casing having a gate passage open at the ends, a gate in the passage, a bonnet covering one end of the passage and adapted to accumulate pulpy material over the gate, a removable plug sealing the other end of the gate passage whereby the same may be cleaned of the pulpy material that may be in the way of the gate, a rod from the gate passing through the bonnet, a lever pivotally connected to the main section and to the rod for moving the gate in the passage, said bonnet having openings on each side of the rod in alinement with the gate for cleaning the bonnet from pulpy material, and swinging covers for said openings normally closing the same.

5. In a sliding gate valve for pulpy material, a main section having a gate passage open at the ends, a gate in the passage, a bonnet for the gate covering one end of the passage and adapted to accumulate pulpy material above the gate, the contour of the bonnet being that of the gate, a removable plug sealing the other end of the gate passage whereby the main section may be cleaned of pulpy material below the gate, a rod from the gate through the bonnet, a lever connected to the rod for actuating the gate in the passage, said bonnet having openings on each side of the rod in alinement with the gate for cleaning the bonnet of pulpy material, and swinging covers for the openings normally closing the same.

In testimony whereof I have signed my name to this specification in the presence of two subscribing witnesses.

RALPH J. RILEY.

Witnesses:
FRANK M. STROUT,
WILL A. KELLEY.